Aug. 9, 1966  K. W. HALLDEN  3,264,920
FLYING PRESS

Filed April 21, 1964  4 Sheets-Sheet 1

INVENTOR.
*Karl W. Hallden*
BY
*Walter Spruegel*
Attorney.

Aug. 9, 1966  K. W. HALLDEN  3,264,920
FLYING PRESS

Filed April 21, 1964  4 Sheets-Sheet 2

INVENTOR.
Karl W. Hallden
BY
Attorney

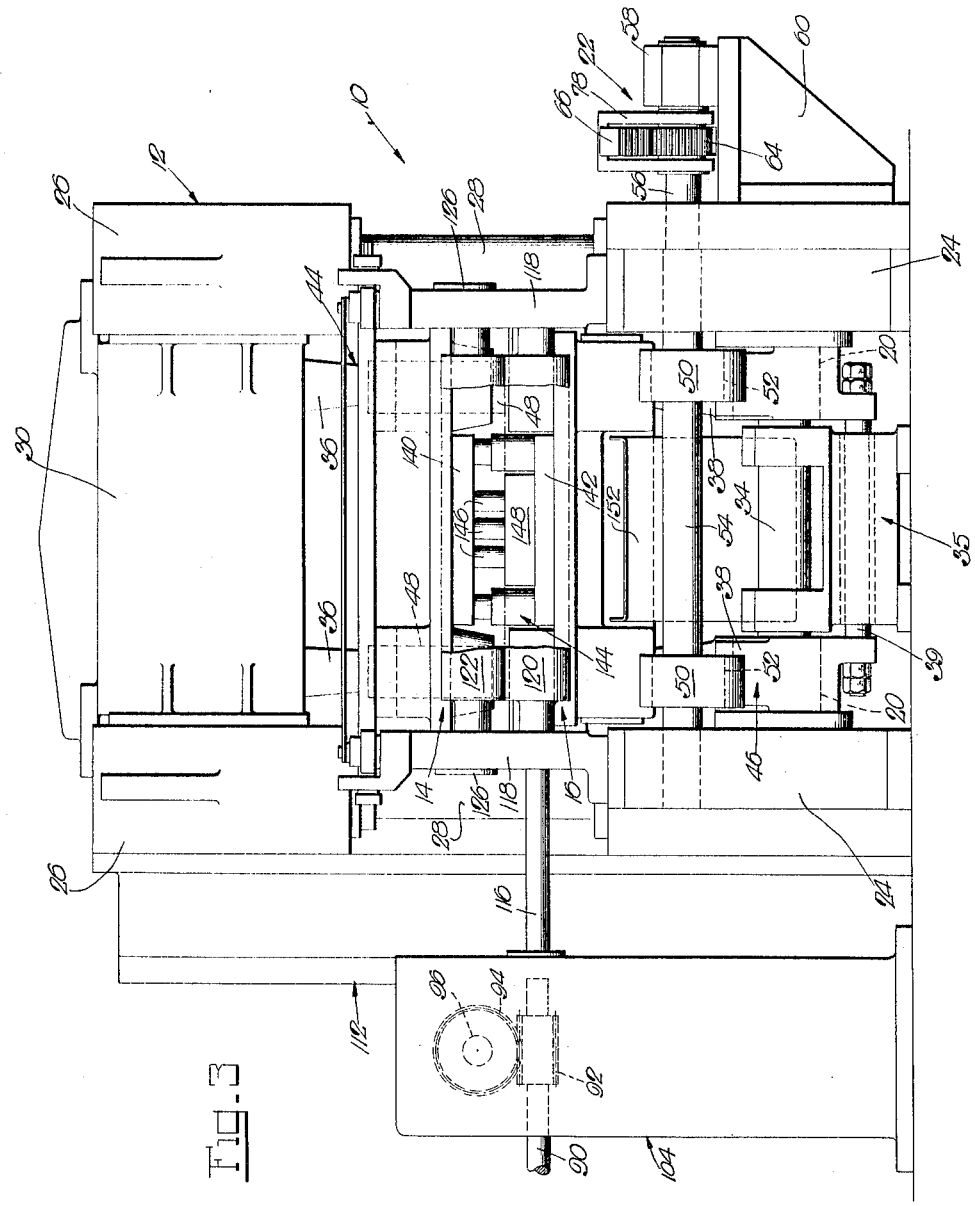

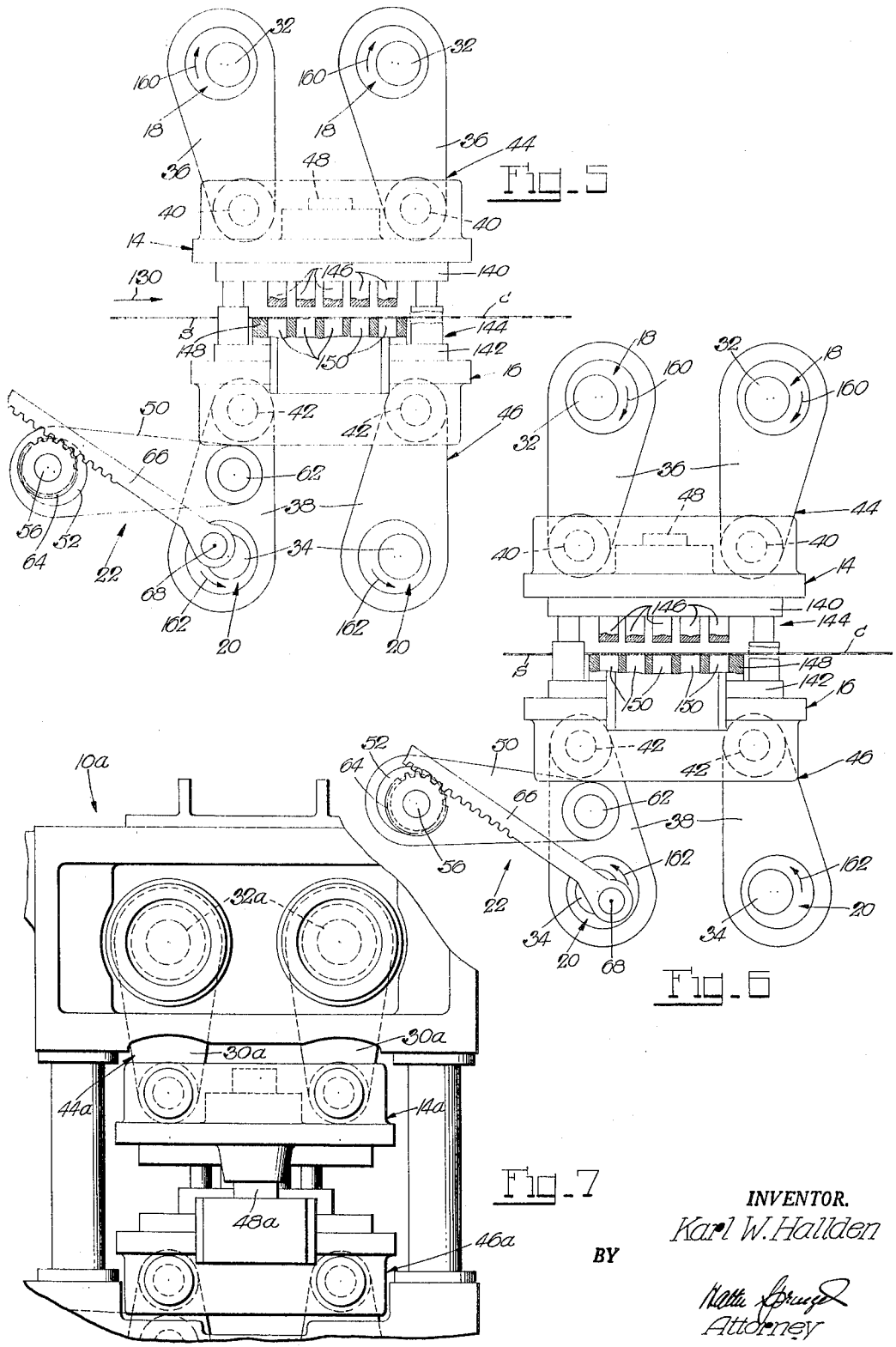

United States Patent Office 3,264,920
Patented August 9, 1966

3,264,920
FLYING PRESS
Karl W. Hallden, Thomaston, Conn., assignor to The Hallden Machine Company, Thomaston, Conn., a corporation of Connecticut
Filed Apr. 21, 1964, Ser. No. 361,450
8 Claims. (Cl. 83—311)

This invention relates to presses in general, and to flying presses in particular.

In flying presses of one known type, the die-carrying platens are, for their operational movements strokewise and also in stock-feed direction, directly journalled on driven operating eccentrics. In flying presses of another known type, a frame with one of the die-carrying platens fixed thereon is directly journalled on driven operating eccentrics for the same operational movements of this platen, i.e., strokewise and also in the feed direction of the stock, while the other platen is guided on the frame for its stroke motions and also for its participation in the stock-feed following motions of its companion platen and has its operational strokes imparted by a pivoted arm which has a toggle-like action on the platen on the drive of the frame by the eccentrics. However, even though these flying presses have the highly desirable advantage over stationary presses of performing on continuously fed stock, they have not come into wide use and have even been discarded in quite a few instances owing to certain deficiencies. Thus, the operating parts of these prior flying presses are subject to rather rapid and severe wear with ensuing early deterioration of die operations and short life of the dies. This is due in large measure to the massive construction of the companion platens in the one type of flying presses, and of the platen-carrying frame in the other type of flying presses, as is required by their direct mount on the operating eccentrics. Thus, operational friction encountered by, and hence wear of, these structures and their operating eccentrics is considerable in any event, and becomes quickly excessive at higher operational press speeds, especially since these structures are not only overly massive, but they and their dies also have to pass through the entire stroke region of the operating eccentrics for their motions in work-stroke and stock-following directions. Further, these flying presses are in their adaptation to different die operations not nearly as versatile as desired, which is due to the just mentioned inflexible set-up of passage of the dies for each work stroke and each motion in stock-following direction through the entire stroke region of the operating eccentrics. Keeping this in mind, and further keeping in mind that the dies and stock must at the time of die performance have substantially synchronous speed in the stock feed direction, it becomes quite obvious that the dies must in their active length longitudinally of the stock be accurately coordinated with the invariable extent of their stock-following motions if they are to perform, in blanking parts from uniformly fed sheet stock, for example, in continuous register with the stock and without leaving more than permissible stock scrap. Hence, these flying presses hardly ever adapt themselves to existing dies and, instead, require dimensionally specially designed dies. At that, difficulties in keeping a die operation going uniformly are frequently experienced even with specially designed dies, owing to virtually unavoidable relative creep between the stock and the dies in action especially at higher press speeds. In order to avoid this, recourse was even had to special stock feed arrangements which subject the stock for each die performance alternately to the action of a primary feeder at lower than stock-synchronizing speed and to direct feed action by the die-carrying companion platens at the time of die performance. However, while these special stock feed arrangements achieve the desired end, they not only entail considerable additional cost but also add to the already critical operational friction between, and hence wear of, the operating eccentrics and structures journalled thereon.

It is an object of the present invention to provide a flying press the operating parts of which encounter minimum operational friction which is much reduced from that of the operating parts of the prior flying presses, and hence are subject to minimum wear, so that the press will have a long useful life during which die performance is accurate and the dies will last as long as would be expected in their operation in a stationary press.

It is another object of the present invention to provide a flying press in which the operating eccentrics for the upper and lower die-carrying platens are arranged in multiple pairs, and the platens are carried by arms which are journalled on the respective eccentrics and with which they form parallelogram systems that are swingable about the respective eccentrics, with the platens being in parallelism with each other in any swing position of the systems, and the press has further provisions for swinging these systems, during each revolution of the eccentrics, in unison through one oscillation and with the platens in constant work-stroke alignment with each other. There is thus provided by these swingable parallelogram systems a basic structure which makes for least operational friction and, hence, wear of the parts involved, for the platens need be dimensioned solely for intended die sizes and for adequate structural strength to withstand the shocks and stresses stemming from the die performance on stock, which is achieved on making these platens much less massive than they would have to be for their direct journal support on the eccentrics, while the follower arms may, for their operational oscillation and work-stroke transmission to the platens at entirely safe stresses, be kept reasonably slender, so that the platens and arms constitute a relatively light load on the operating eccentrics.

It is a further object of the present invention to provide a flying press having the aforementioned parallelogram systems and swing provisions for them, of which the swing provisions include a drive for direct power oscillation of only one of the systems, and further include guide posts on one of the platens which slidably receive the other platen and, besides solely guiding the platens for their work strokes in operative alignment with each other, also transmit oscillation of the one system to the other system. With this arrangement, operational work-stroke alignment of the platens in action, which is so very important for smooth, rather than strained, die performance and, hence, long useful life of the dies, is for the longest time exceedingly accurate, i.e., within readily kept very close tolerances of the interfit of the guide posts and platen received thereon, and is entirely unaffected by any dimensional and operational tolerances or wear of any other operating parts of the press. Further with the guide posts dimensioned and accurately fitted with the platen received thereon to keep the platens in accurate workstroke alignment assuredly for the longest time, the guide posts will also transmit the oscillatory motions of the one system to the other system and the utmost accuracy, wherefore the oscillatory motions of both systems are of utmost uniformity and entirely unaffected by any dimensional and operational tolerances or wear of any other operating parts of the press.

Another object of the present invention is to provide a flying press in which the aforementioned swing provisions for the parallelogram systems permit infinite adjustment of the amplitude of oscillation of the systems within a given range, thereby not only permitting the layout and use of new dies of blanking type, for instance, for their blanking of any desired, including maximum, number of parts per work-stroke, but also readily adapting the press to many existing dies for their sustained performance on continuously fed stock in continuous register therewith and with only minimum scrap left. Infinite adjustability of the amplitude of oscillation of the systems is further advantageous in that it readily permits, in a few tries at the most, accurate adaptation of the motions of the dies in stock-feed direction to the actual die performance so as to avoid any out-of-register relative creep between the stock and dies in even the most sustained die performance on the same stock at most any speed.

A further object of the present invention is to provide a flying press in which the aforementioned range within which the amplitude of oscillation of the parallelogram systems is infinitely adjustable, is such that the component motion of the systems in stock-feed direction may be shorter or longer than the strokes of the operating eccentrics, thereby carrying the aforementioned adaptability of the press to dies of different sizes still further.

Other objects and advantages will appear to those skilled in the art from the following, considered in conjunction with the accompanying drawings.

In the accompanying drawings, in which certain modes of carrying out the present invention are shown for illustrative purposes:

FIG. 3 is an end view of the flying press as seen in the direction of the arrow 3 in FIG. 1;

FIGS. 5 and 6 are views in diagrammatic fashion of primary operating parts of the flying press at different stages of the cyclic performance of the latter; and FIG. 7 is a fragmentary view of a flying press embodying the present invention in a modified manner.

Figure 1:
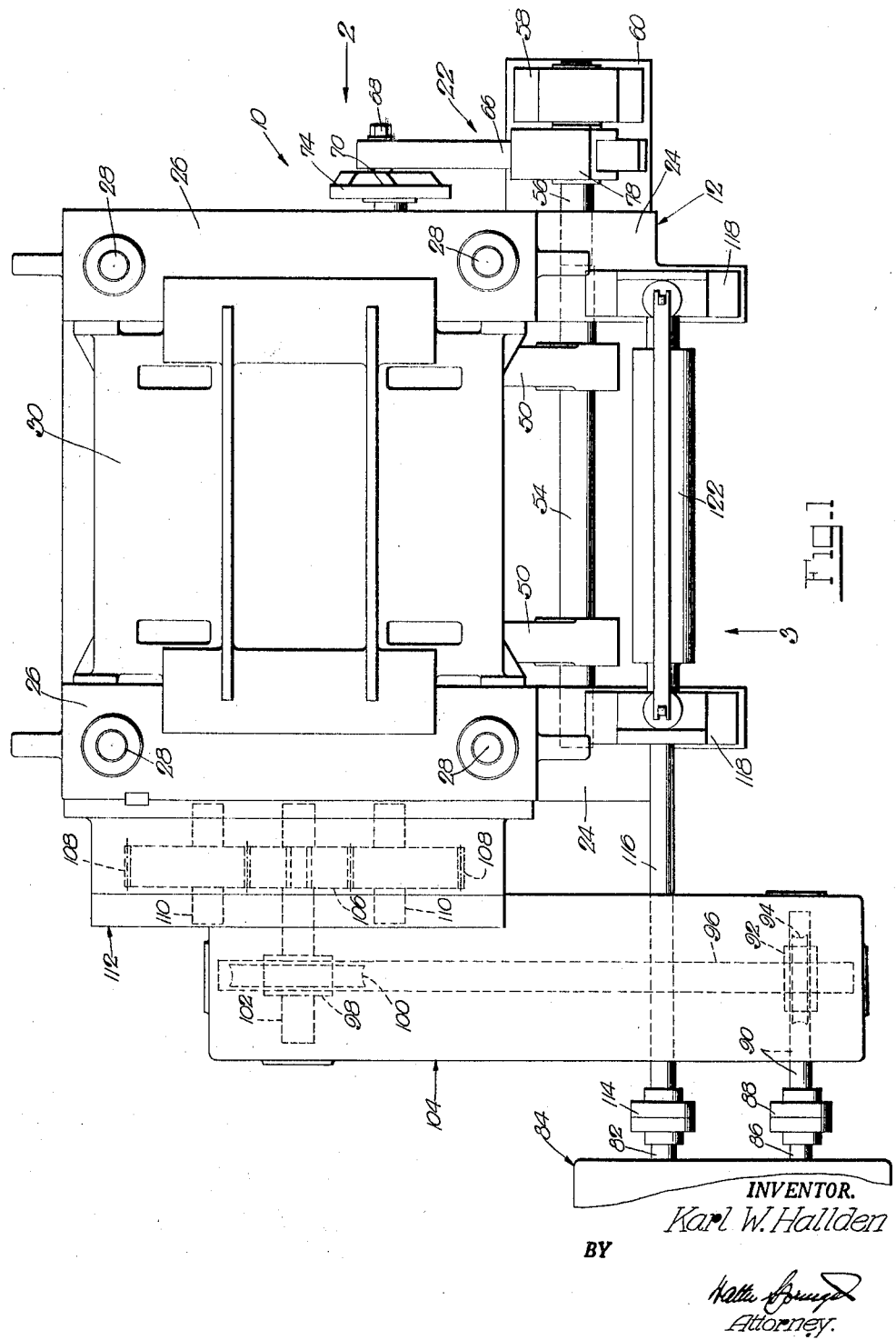
FIG. 1 is a top plan view of a flying press embodying the present invention.
Figure 2:
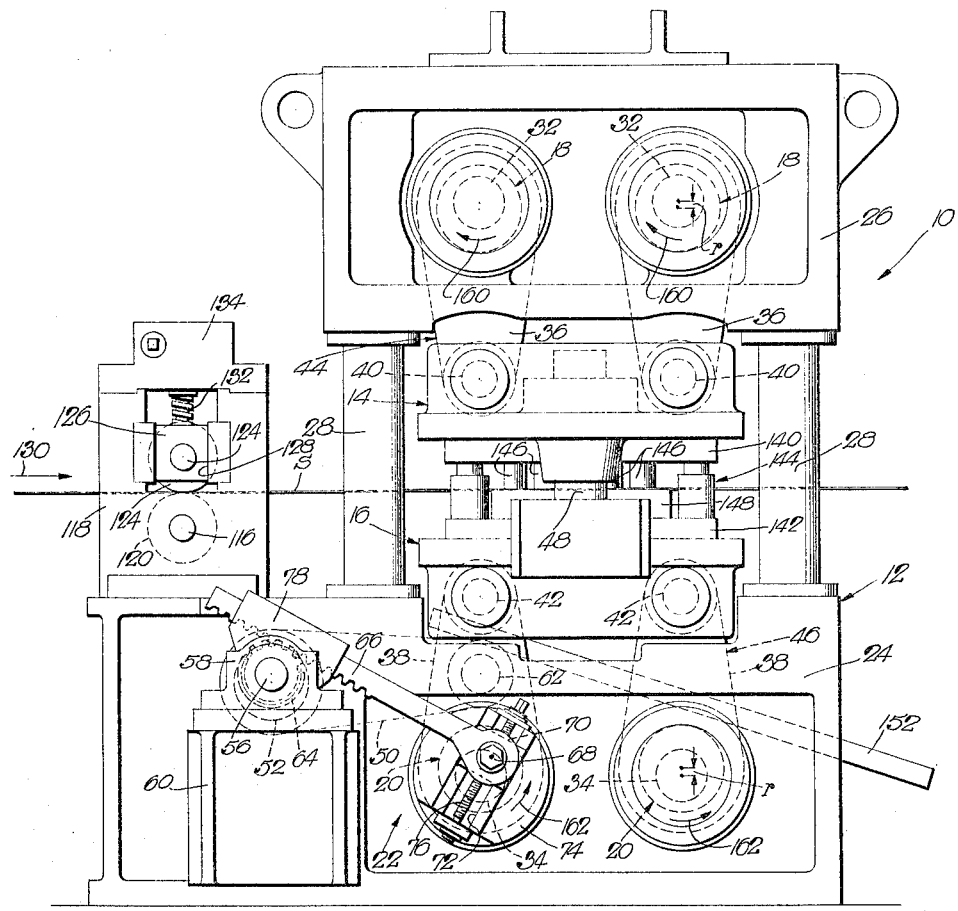
FIG. 2 is a side view of the flying press as seen in the direction of the arrow 2 in FIG. 1.

Referring to the drawings, and more particularly to FIGS. 1 to 3, the reference numeral 10 designates a flying press having a frame 12 which carries certain of the operating devices of the press, such as die-carrying companion platens 14 and 16, operating eccentrics 18 and 20 for the platens 14 and 16, and a device 22 for imparting flying motion to the platens 14 and 16 for their substantial synchronism with continuously fed stock $s$ at the moments of die performance thereon. The frame 12 is in this instance articulated and comprises spaced bottom brackets 24 and similarly spaced top brackets 26 which are mounted on pillars 28 on the bottom brackets 24 and joined to each other by an intermediate casing 30.

Suitably journalled in the top and bottom brackets 26 and 24 are upper and lower pairs of spaced shafts 32 and 34 (FIGS. 2 and 3) which carry the operating eccentrics 18 and 20, respectively. For optimum support, the upper and lower shafts 32 and 34 are preferably further journalled in the casing 30 and a bearing bracket 35, respectively (FIG. 3). The paired shafts 32 and 34 lie with their axes in spaced parallel, presently horizontal, planes, with all shafts extending parallel to each other, and in this instance the shafts of both pairs lie with their axes also in spaced vertical planes (FIG. 2). Each of the shafts 32 and 34 carries in this instance two preferably equally spaced eccentrics 18 and 20, respectively, and the eccentrics on either pair of shafts 32 and 34 have the same eccentric radius $r$, with all eccentrics having in this instance the same eccentric radius and, hence, the same operating stroke which is equal to $2r$. In operation of the press, the shafts 32 and 34 are simultaneously driven at the same speed and in the same directions, respectively with the shafts 32 and 34 being preferably driven in opposite directions, as further described hereinafter, and the eccentrics are so coordinated that, in one drive position of the shafts (FIG. 2), the eccentrics on either pair of shafts 32 and 34 extend with their largest radii closest and normal to the plane in which the axes of the other pair of shafts lie.

Journalled on the upper and lower eccentrics 18 and 20 are upper and lower follower straps or arms 36 and 38, respectively (FIGS. 2 and 3), of which those on the eccentrics on each shaft are preferably joined by a tie rod, such as the tie rod 39 in FIG. 3 which connects two of these arms. All of these arms are in this instance of the same length, and the arms 36 and 38 pivotally carry at 40 and 42 the upper and lower platens 14 and 16, respectively. The upper and lower arms 36 and 38 thus form with the respective upper and lower platens 14 and 16 upper and lower parallelogram systems 44 and 46 (FIGS. 2, 5 and 6) which are swingable about the respective upper and lower eccentrics 18 and 20 with the platens 14 and 16 in parallelism with each other.

The platens 14 and 16 are, preferably and advantageously, guided on each other for their motions in work-stroke relation with one another, i.e., normal to the planes in which the axes of the upper and lower shafts 32 and 34 lie. To this end, one of the platens, in this instance the lower platen 16, carries a plurality, presently two, spaced guide posts 48 which slidably receive the upper platen 14 (FIGS. 2 and 3).

The device 22 for imparting flying motion to the platens 14 and 16 includes in this instance the lower operating eccentrics 20 and a pair of pivoted arms 50 (FIGS. 1 to 3). The arms 50 are in this instance follower arms of identical length which are journalled, and hence pivoted, on spaced, identical and angularly aligned, cams or eccentrics 52 on a shaft 54 that is suitably journalled in the bottom brackets 24 of the press frame and has an extension 56 which is further journalled in a bearing 58 on a side bracket 60 on the press frame 12. The other ends of the arms 50 are at 62 pivotally connected with the arms 38 on the nearest lower operating eccentrics 20 (FIG. 2). Carried by the shaft extension 56 is a gear 64 which is in mesh with a rack 66 that is pivoted at 68 on a slide block 70 in a diametrical guideway 72 in a crank disc 74 which is carried at one end of the nearest lower shaft 34 (FIGS. 1 to 3) with the slide block 70 being held in the guideway 72 in adjusted position therein by a threaded spindle 76 on the disc 74 (FIG. 2). The rack 66 is guided in a swing bracket 78 which straddles the gear 64 and is pivoted on the shaft extension 56, whereby the rack is held in permanent mesh with the gear and free to swing about the axis of the latter.

Assuming now that in FIG. 2 the slide block 70 is so adjusted in the guideway 72 in the crank disc 74 that its pivot axis with the rack 66 coincides with the axis of the crank disc, it stands to reason that in operation of the press, i.e., on the drive of the operating eccentrics 18 and 20, the rack 66 will not be reciprocated so that the eccentrics 52 become fixed pivots for the arms 50. In that event, the pivot connections 62 of the arms 50 with the arms 38 will serve as a floating pivot about which the lower parallelogram system 46 is swung by the driven lower eccentrics 20, with the system 46 passing through one oscillation for each revolution of the eccentrics 20 and the latter also imparting through the system work strokes to the lower platen 16, and more particularly one work stroke for each revolution of the eccentrics, as will be readily understood.

It will be noted that the device 22 described so far imparts oscillations to only one parallelogram system, in this instance to the lower system 46. However, the upper parallelogram system 44 must of necessity participate in the oscillatory motion of the lower system 46 if the platens 14 and 16 are to perform their designated functions of passing through complemental work strokes while being at all times in operational alignment. To this end, the guide posts 48 function additionally to transmit power oscillation of the lower system 46 to the upper system 44, with the latter oscillating about the driven upper eccentrics 18 which then also impart through the system 44 work strokes to the upper platen 14. It thus follows from the preceding that the guide posts 48 are relied on solely to guide the platens 14 and 16 for their work strokes in operative alignment with each other and also to transmit oscillatory motion of the lower parallelogram system 46 to the upper parallelogram system 44. Of course, while transmission by the guide posts 48 of primary oscillatory motion from the lower system 46 to the upper system 44 about the upper eccentrics 18 is imperative for achieving functional oscillation at all of the upper system, the upper eccentrics 18, by virtue of their drive, will function to add to or modify the transmitted oscillatory motion of the upper system 44, as will be readily understood. In the exemplary press described so far, the upper eccentrics 18, being driven in a direction preferably opposite to the drive direction of the lower eccentrics 20, will modify the transmitted oscillatory motion of the upper system 44 so that it conforms exactly to the oscillatory motion of the lower system 46 at any instant (FIGS. 5 and 6). The upper and lower systems 44 and 46, and hence also the platens 14 and 16 thereof, have compound oscillatory and platen-stroke motions on the drive of the upper and lower eccentrics 18 and 20.

The drive of the upper and lower eccentrics 18 and 20 is derived from a prime mover (not shown) which may be an electric motor of preferred variable-speed type that is drivingly connected with one shaft, for example the input shaft 82, of an infinitely adjustable speed-ratio unit 84 which has also an output shaft 86 (FIG. 1). The output shaft 86 of this unit 84 is coupled at 88 to a shaft 90 carrying a worm 92 which is in mesh with a worm gear 94 on a shaft 96 that also carries a worm 98 which is in mesh with a worm gear 100 on a shaft 102 (FIG. 1). The worm and worm-gear carrying shafts 90, 96 and 102 are received and suitably journalled in a housing 104, and the shaft 102 carries a gear 106 which through one-to-one ratio gears 108 is drivingly connected with the upper and lower shafts 32 and 34. The gears 108 are carried by stub shafts 110 which are received and suitably journalled in another housing 112 alongside the press frame 12. The upper and lower shafts 32 and 34 are thus driven at the same speed, and the preferred gear connection 108 between the common drive gear 106 and these shafts 32 and 34 is such that the latter are driven in opposite directions, as already mentioned.

The input shaft 82 of the speed-ratio unit 84 is at 114 coupled to a shaft 116 (FIG. 1) which is suitably journalled in pedestals 118 on the base brackets 24 of the press frame and carries a stock feed roll 120. A companion feed roll 122 is carried by a shaft 124 (FIG. 2) the opposite ends of which are journalled in slide blocks 126 in guideways 128 in the pedestals 118, so that feed roll 122 is movable to and from the other feed roll 120, with the feed roll 122 being in this instance yieldingly urged toward the feed roll 120 for feeding stock $s$ therebetween in the direction of the arrow 130 in FIG. 2 on the normal power drive of the feed roll 120. To this end, springs 132 of preferred adjustable compression are interposed between the slide blocks 126 and end covers 134 on the respective pedestals 118 (FIG. 2).

The speed ratio unit 84 is a commercial device known, and hereinafter sometimes referred to, as a "PIV." This unit 84 is adjustable for driving the output shaft 86 thereof from the driven, ordinarily constant-speed, input shaft 82 at infinitely variable speeds within certain limits. Structural details of this unit 84 are not disclosed herein, but are fully illustrated in my prior Patent No. 2,201,581, dated May 21, 1940.

Figure 4:
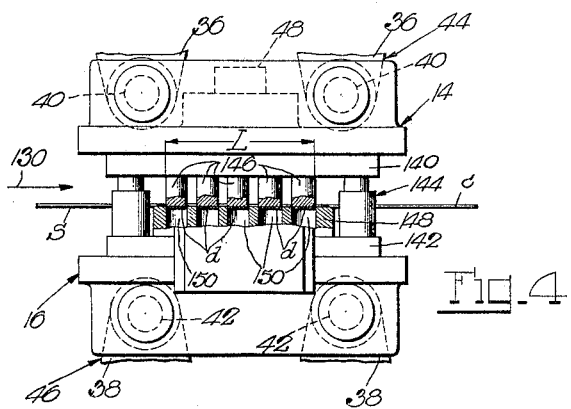
FIG. 4 is a fragmentary section through a part of the flying press at a certain stage of its cyclic performance.

The present press may be used for blanking parts from continuously fed sheet stock or otherwise performing on continuously fed stock, and is used in the present example for blanking parts from continuously fed sheet stock $s$. To this end, the platens 14 and 16 have suitably mounted thereon the members 140 and 142 of a die set 144 which in this instance carry an appropriate plural number of blanking punches 146 and a die block 148, respectively, of which the block 148 has the same number of die apertures 150 with which the punches 146 cooperate during each work stroke of the platens 14 and 16 simultaneously to blank from the stock $s$ as many parts, such as the discs $d$, for example (FIG. 4), which drop or are pushed through the die apertures 150 and gravitate onto an inclined chute 152 (FIGS. 2 and 3) on which they slide into a collector bin or the like (not shown).

To adapt the press to the exemplary die set 144 of a given overall stock-blanking length L of the punches 146 (FIG. 4), the PIV 84 is first adjusted so that at a given constant speed of the input shaft 82 thereof, and hence at a given stock feed rate, the output shaft 86 is driven at such speed that the operating eccentrics 18 and 20 pass through one complete revolution during stock advance slightly in excess of the length L. In making this initial adjustment in the press, the same is conditioned so that on subsequent press operation the punches 146 and die apertures 150 will, on successive work strokes of the platens 14 and 16, cooperate to blank the parts $d$ from the fed stock $s$ while remaining in register with the latter and leaving only minimum stock scrap $c$. However, this initial press adjustment, while imperative to establish the basic relation between stock feed rate and r.p.m. of the operating eccentrics at which the die members will on their subsequent performance remain in register with the stock and leave minimum stock scrap, takes no part in achieving the equally imperative synchronization of the die members with the fed stock at the moments of die performance on the stock. Thus, assuming that the PIV is now correctly adjusted for the purpose as described above, but that the rack 66 has not been adjusted from the previously described exemplary alignment of its crank axis with the axis of the crank disc 74, jogging of the press would quickly indicate that at the prevailing amplitude of oscillation of the systems 44 and 46 the die members would not be in synchronism with the fed stock at the moment of blanking, and that the amplitude of oscillation of these systems will have to be increased in order to achieve synchronism in this respect. Accordingly, the slide block 70 is adjusted in the guide way 72 of the crank disc 74 toward and into the position shown in FIG. 2 in which synchronization of the die members with the fed stock will occur at the moments of blanking. Correct adjustment of the slide block 70 on the crank disc 74 is readily achieved with the aid of suitable index marks (not shown) on the crank disc 74 and on jogging the press. The press is now ready for operation and may be started.

Following is a description of an operating cycle of the press in action, with three successive stages thereof being shown in FIGS. 2, 4, 5 and 6. With the upper and lower operating eccentrics 18 and 20 being driven clockwise and anticlockwise, respectively, as indicated by the arrows 160 and 162 in FIGS. 2, 5 and 6, the platens 14 and 16 and the die members thereon reach the ends of their work strokes, and blanking has just been completed (FIG. 4), as the eccentrics 18 and 20 pass through the momentary positions in FIG. 2. It is at this stage where the platens 14 and 16 and the die members thereon proceed in synchronism with the fed stock $s$. On the continued drive of the operating eccentrics 18 and 20 for the next 90° toward and into the respective positions shown in FIG. 5, they cause the platens and die members thereon to proceed on their return strokes, and the die members will soon separate before they are out of substantial synchronism with the fed stock, as will be readily understood. On the same continued drive of the operating eccentrics 18 and 20, the latter in conjunction with the guide posts 48 will also impart swing motion to the lower and upper parallelogram systems 46 and 44 clockwise and anticlockwise, respectively (FIG. 5), with the swing motion of the lower system 46 being about its pivot connection 62 with the arm 50, and the upper system 44 following suit owing to its guide post connections 48 with the lower system. Further, during the same continued drive of the operating eccentrics 18 and 20, the eccentrics 52 are, by the action of the crank disc 74, rack 66 and gear 64, shifted from the position in FIG. 2 into the position in FIG. 5, wherefore the eccentrics 52 impart through the follower arms 50 and their pivot connections 62 with the lower system 46 additional superimposed swing motion to this lower system in the same, clockwise, direction, but about the driven eccentrics 20. This additional superposed swing motion of the lower system 46, is, through the guide posts 48, also transmitted to the upper system 44 in its exemplary anticlockwise swing direction, as will be readily understood. It will also be noted that the swing motions of the systems 44 and 46 will be at optimum speed on the passage of the latter through the respective positions in FIG. 2, i.e., at the time of die and stock synchronization, and that the swinging motions of these systems will continue at gradually diminishing speed and will reach zero speed when they reach the respective positions in FIG. 5.

With the arrival of the operating eccentrics 18 and 20 in the momentary position in FIG. 5, the platens 14 and 16 and the die members thereon conclude their motion in stock feed direction (arrow 130), and they reverse their motion on the continued drive of the operating eccentrics 18 and 20. Thus, on the continued drive of the operating eccentrics 18 and 20 from their positions in FIG. 5 through the next 90°, i.e., into positions 180° apart from their positions in FIG. 2, they will cause the systems 44 and 46 to swing clockwise and anticlockwise, respectively (FIG. 5), as will be readily understood. Simultaneously therewith the eccentrics 52 will, by the action of the crank disc 74, rack 66 and gear 64, be shifted from the position in FIG. 5 into the position in FIG. 2, with the result that the eccentrics 52 will, through the follower arms 50 and their pivot connections 62 with the lower system 46, impart to this lower system additional superimposed swing motion about the driven eccentrics 20 in the same, now anticlockwise, direction, with this additional superposed swing motion being by the guide posts 48 also transmitted to the upper system 44 in the same, now clockwise, direction. The systems 44 and 46 thus reach on the continued drive of the operating eccentrics momentary swing positions exactly as shown in FIG. 2, except that the platens 14 and 16 and die members thereon are then farthest apart, being at the ends of their return strokes owing to the then angular positions of the operating eccentrics 180° apart from their positions shown in FIG. 2. Further, the swing motions of the systems 44 and 46 accelerate from zero speed in their positions in FIG. 5 to optimum speed when they pass through the positions just described in which the platens 14 and 16 and their die members are at the ends of their return strokes.

On further continued drive of the operating eccentrics 18 and 20 through the next 90° into the respective positions shown in FIG. 6, the systems 44 and 46 continue their respective clockwise and anticlockwise swinging motions, but at gradually decelerating speed which reaches zero on arrival of the systems in the respective positions shown in FIG. 6. Further, it is during such continued drive of the operating eccentrics 18 and 20 that the platens 14 and 16 and the die members thereon begin their respective work strokes toward each other, with the platens and die members thereon having concluded one-half of their work strokes on arrival of the systems 44 and 46 in the respective positions in FIG. 6.

On continued drive of the operating eccentrics 18 and 20 from their positions in FIG. 6 into their positions in FIG. 2, the systems 44 and 46 reverse their swing and proceed in the stock feed direction from zero speed at constant acceleration until they reach optimum speed, which is synchronous speed with the fed stock, when they reach their positions in FIG. 2, as will now be readily understood. This concludes an operating cycle of the press, and more particularly of the systems 44 and 46 with their platens 14 and 16 and exemplary die members thereon, with the amplitude of oscillation of the systems for this exemplary press operation being indicated by the opposite swing end positions of the systems in FIGS. 5 and 6. This cycle will be repeated over and over again as long as the press is in operation.

The present press is in its structural and functional aspects highly advantageous, as has already been pointed out hereinbefore. The present press is also noteworthy for its high operational versatility and ready adaptability within relatively wide limits to different die and other operations on continuously fed stock. Thus, the press is readily adaptable to dies of optimum blanking length longitudinally of the stock as well as to dies, and many existing dies, which in their blanking lengths are shorter, and may even be much shorter, than dies of optimum blanking length. In this connection, it is a simple matter to obtain, on adjustment of the PIV within its relatively wide range, the correct number of r.p.m. of the operating eccentrics 18 and 20 for blanking parts with minimum scrap from sheet stock at a given feed rate by dies which have shorter or longer blanking lengths than the exemplary dies shown herein, and it is equally simple to adjust the rack 66 on the crank disc 74 to obtain synchronization of the dies with the fed stock at the time of blanking. In this connection, the radius of the crank disc 74 and the eccentric radii of the eccentrics 52 are preferably such that within the adjustment range of the rack 66 on the crank disc 74 synchronous speed of the dies with the fed stock at the time of blanking is achieved for all adjustments of the PIV within its range at which blanking of parts from continuously fed stock is achieved with minimum scrap. The range within which the operation of the press may accurately be adapted to dies of different blanking lengths is thus particularly wide, for note the considerable amplitude of oscillation of the parallelogram systems 44 and 46 (FIGS. 5 and 6) for the exemplary adjustment of the rack 66 on the crank disc 74 to one side of, and fairly closely spaced from, the axis of the latter (FIG. 2), and consider how much larger the amplitude of oscillation of the systems 44 and 46 may be for a different die set-up on adjusting the rack on the same side of the crank disc axis still further away from the latter. Further, while the swing motions of the systems 44 and 46 induced by the eccentrics 52 and superposed upon their primary swing motions as caused by the operating eccentrics 18 and 20, are additive to these primary swing motions of the systems as long as the rack 66 is adjusted to the side of the crank disc axis shown in FIG. 2, these superimposed swing motions of the systems are subtractive from the primary swing motions of the latter on adjustment of the rack on the crank disc anywhere on the other side of the axis of the latter. Further, on having by proper adjustment of the PIV 84 and of the rack 66 on the crank disc 74 once established the correct ratio between stock feed rate and r.p.m. of the operating eccentrics 18 and 20 and the correct amplitude of oscillation of the parallelogram systems for part-blanking performance of given dies with minimum scrap left-over, the rate of operation of the press can be changed, for example stepped up by simply driving the input shaft 82 of the PIV 84 at higher speed from the mentioned variable-speed motor which in no wise changes the ratio between stock feed rate and r.p.m. of the operating eccentrics and the amplitude of oscillation of the parallelogram systems, and hence the correct performance of the dies with the same minimum scrap left-over. Further, and as already mentioned, the present press may with equal advantages be used for other-than-blanking operations, such as marking or otherwise working on or treating stock in motion, and may also be used as a flying shear on merely mounting companion sheer blades on the platens.

Reference is now had to FIG. 7 which shows a modified press 10a that may in all respects be like the described press 10, except that the upper platen 14a is carried by arms 30a which, rather than being journalled on driven eccentrics, are journalled, and hence pivoted, on fixed shafts 32a. With the operation of this modified press 10a being otherwise exactly as that of the press 10, it is obvious that the upper platen 14a has no work strokes other than those entailed by the oscillation of the upper parallelogram system 44a about the fixed shafts 32a as transmitted to it by the lower power-oscillated parallelogram system 46a through intermediation of the guide posts 48a. This modified press 10a is fully functional for many operations, including die-blanking operations.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a flying press, the combination of a set of spaced pivots and arms swingable thereon; a set of spaced eccentrics and arms swingable on said eccentrics as pivots; opposite companion platens for mounting a die set, said platens having pivot connections with said arms of said sets, respectively, and forming therewith parallelogram systems swingable about said pivots of the respective sets with the platens in parallelism with each other; guide means on one of said platens slidably receiving the other platen for solely guiding said platens for their operational strokes in alignment with each other and for transmitting swinging motion of one system to the other system; drive means for said eccentrics to impart operational strokes to the associated platen; and a device operatively connected with, and operative to impart swinging motion to, said one system.

2. In a flying press, the combination of two sets of spaced eccentrics with follower arms thereon; opposite companion platens for mounting a die set, said platens being pivotally carried by said arms of said sets, respectively, and forming therewith parallelogram systems swingable about the eccentrics of the respective sets with the platens in parallelism with each other; guide means on one of said platens slidably receiving the other platen for solely guiding said platens for their operational strokes in alignment with each other and transmitting swinging motion of one system to the other system; drive means for said eccentric sets to impart operational strokes to said platens; and means operatively connected with, and operative to impart swinging motion to, said one system.

3. In a flying press, the combination of a set of spaced pivots and arms swingable thereon; a set of spaced eccentrics and arms swingable on said eccentrics as pivots; opposite companion platens for mounting a die set, said platens having pivot connections with said arms of said sets, respectively, and forming therewith parallelogram systems swingable about said pivots of the respective sets with the platens in parallelism with each other; another pivoted arm having with one arm of one of said systems another pivot connection located to act as an additional swing pivot for said one system; guide posts on one of said platens slidably receiving the other platen for solely guiding said platens for their operational strokes in alignment with each other and transmitting swinging motion of either system to the other system; and drive means for said eccentrics, with said eccentrics imparting on their drive compound swinging and platen-stroke motions to the associated system.

4. In a flying press, the combination of two sets of spaced eccentrics with follower arms thereon; opposite companion platens for mounting a die set, said platens being pivotally carried by said arms of said sets, respectively, and forming therewith parallelogram systems swingable about the eccentrics of the respective sets with the platens in parallelism with each other; another pivoted arm having with one arm of one of said systems another pivot connection located to act as an additional swing pivot for said one system; guide posts on one of said platens slidably receiving the other platen for solely guiding said platens for their operational strokes in alignment with each other and transmitting swinging motion of either system to the other system; and drive means for said eccentrics, with the eccentrics of the set associated with said one system imparting on their drive compound swinging and platen-stroke motions to said one system, and the eccentrics of the other set imparting on their drive platen-stroke motion to the other system.

5. In a flying press, the combination of two sets of spaced eccentrics with follower arms thereon; opposite companion platens for forming a die set, said platens being pivotally carried by said arms of said sets, respectively, and forming therewith parallelogram systems swingable about the eccentrics of the respective sets with the platens in parallelism with each other; guide means on one of said platens slidably receiving the other platen for solely guiding said platens for their operational strokes in alignment with each other and transmitting swinging motion of either system to the other system; drive means for said eccentric sets for imparting operational platen-stroke motion to the respective systems; and mechanism including a pivot connection with one arm of one system about which said one arm swings on the drive of the eccentrics associated with said one system, said mechanism being operated in timed relation with said associated eccentrics and presettable to impart to said one system for each revolution of said associated eccentrics on oscillation of infinitely variable amplitude about said driven associated eccentrics.

6. The combination in a flying press as set forth in claim 5, in which said mechanism is presettable to impart to said one system oscillations of amplitudes infinitely variable between zero and a maximum.

7. A flying press, comprising an upright frame; upper and lower pairs of spaced shafts journalled in said frame and lying with their axes in spaced parallel first planes, respectively, with all shafts being parallel to each other; sets of upper and lower eccentrics carried by said upper and lower shafts, respectively, with each shaft having two spaced eccentrics and the eccentrics of each set having the same stroke; means for simultaneously driving all shafts at the same speed and the shafts of each pair in the same direction, with said eccentrics being coordinated so that in one drive position of said shafts the eccentrics on the shafts of either pair extend with their largest radii closest and normal to said plane of the shafts of the other pair; sets of upper and lower follower arms journalled with one end on said upper and lower eccentrics, respectively, with the arms of each set being of the same length; upper and lower companion platens for mounting a die set, said platens being pivotally carried by the other ends of said upper and lower arms, respectively, to form with the latter parallelogram systems swingable about said upper and lower eccentrics, respectively, with said platens in parallelism with each other; guide posts on one of said platens having their axes normal to said planes and slidably receiving the other platen for solely guiding said platens for their operational strokes in alignment with each other and transmitting swinging motion of either of said systems to the other system; and a device for imparting to one of said systems an oscillation about the associated eccentrics for each revolution of the latter so that in said one drive position of the shafts said arms extend normal to said planes.

8. A flying press as set forth in claim 7, in which the shafts of said pairs are driven in opposite directions, respectively.

References Cited by the Examiner
UNITED STATES PATENTS

| | | | |
|---|---|---|---|
| 846,362 | 3/1907 | Swift | 83—328 X |
| 2,144,308 | 1/1939 | Hallden | 83—311 X |
| 2,258,339 | 10/1941 | Sieger | 83—311 |
| 2,262,919 | 11/1941 | Bruker | 83—328 X |
| 2,292,635 | 8/1942 | Heath | 83—628 X |
| 2,406,808 | 9/1946 | Conner | 83—328 X |
| 2,440,848 | 5/1948 | Conner | 83—328 |
| 2,564,354 | 8/1951 | Conner | 83—328 X |
| 3,128,548 | 4/1964 | Zelisko | 83—328 X |

ANDREW R. JUHASZ, *Primary Examiner.*

WILLIAM W. DYER, JR., *Examiner.*

F. T. YOST, *Assistant Examiner.*